March 19, 1946.    R. K. LEE    2,396,860
SPEED REDUCING UNIT
Filed Jan. 23, 1943

INVENTOR.
ROGER K. LEE
BY
ATTORNEYS

Patented Mar. 19, 1946

2,396,860

UNITED STATES PATENT OFFICE 2,396,860

SPEED REDUCING UNIT

Roger K. Lee, Detroit, Mich.

Application January 23, 1943, Serial No. 473,335

1 Claim. (Cl. 74—242.9)

The present invention relates to speed reducing units and has among its objects a self-contained reduction unit capable of use with existing installations without modification thereof.

Another object is a reduction unit which makes possible a considerable speed reduction in belt-driven installations without the necessity of changing pulleys.

Still another object is a unit which automatically regulates belt tension in accordance with the load resistance.

Still other objects and advantages will readily occur to those skilled in the art upon reference to the following description, and the accompanying drawing in which Figure 1 is a side elevation showing a motor with the present unit and a belt drive.

Figure 2:
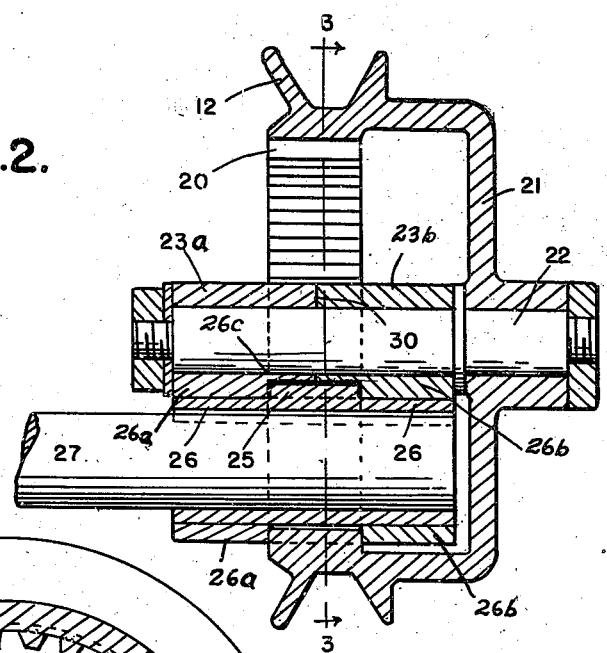
Figure 2 is a section of the unit taken on line 2—2 of Figure 1.
Figure 3:
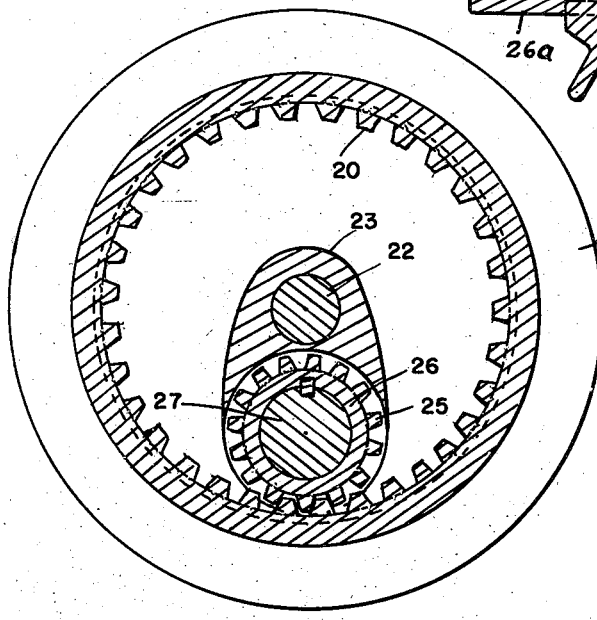
Figure 3 is a section on line 3—3 of Figure 2.

In the drawing the driven pulley of a machine of any desired character is indicated at 10, and a drive belt therefor at 11. This drive belt 11 passes over a drive pulley 12 and is driven from a motor 13. The drive pulley 12 includes a speed reducing unit, the construction of which is shown clearly in Figures 2 and 3.

In these figures the pulley 12 is shown as provided on its interior periphery with an internal gear 20 and carried on a web 21 which is displaced from the plane of the pulley to permit insertion of the parts to be described.

The pulley is fixed for rotation upon a short shaft 22 extending axially thereof into a bearing member 23. It is preferred to fix the pulley to the shaft and allow the latter to rotate in the bearing member. This bearing member also is provided with suitable bearings for a small planetary spur gear 25, the axis of which is displaced radially of the shaft 22 sufficiently so that the gear 25 meshes with the internal gear 20.

The gear 25 is preferably made integral with a trunnion 26 on either side of the gear and these trunnions are mounted in spaced bearings 26a and 26b in the bearing member 23. The gear 25 and trunnions 26 are keyed to a drive shaft 27 which may be the spindle of motor 13.

It should be noted that the pulley 12, internal gear 20 and gear 25 should be in alignment, that is, their center planes should be coincident.

Figure 1:
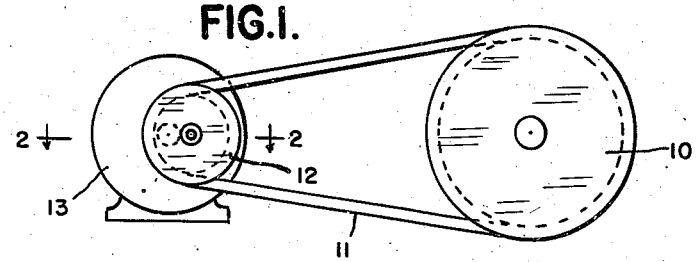

To provide for assembling the device, the bearing member 23 is preferably split as indicated at 30 forming two contiguous sections 23a and 23b having the bearing for the shaft 22 at its inner portion and provided at its outer portion with spaced trunnion receiving bearings 26a and 26b and having an intervening recess 26c located between the spaced bearings 26a and 26b for reception of the planetary gear. This unit is carried floatingly on the shaft 27, i. e. supported by the shaft, and when the parts are in operating position, the several shafts will occupy approximately the position shown in Fig. 1, i. e., the shaft of driven pulley 10, the shaft 22 and the shaft 27 will be approximately in line, with the shaft 22 between the other two shafts. This position will be maintained by the normal tensioning of the belt 11. One end of the short shaft 22 is provided with fastening means for engaging the web 21 of the pulley and the other end of said shaft 22 is provided with fastening means which engage one of the sections of the bearing member and secure the sections thereof in their assembled position.

With the present device, the tension of the belt 11 need not be as great as with the conventional belt pulley assembly, since any load on the driven pulley 10 will tend to move the axis of the pulley 12 around the axis of the drive shaft 27 and thereby increase the tension of the belt 11 in accordance with the resistance offered by the driven pulley 10.

The device therefore not only provides a speed reduction measured by the relative sizes of the gears 20 and 25, but provides means for regulating the belt tension in accordance with the load and when the load is reduced automatically reduces the tension of the belt so that during idling the end pressure on the various bearings is very greatly reduced.

It is of course obvious that instead of providing bearings in the member 23 for the shaft 22 and fixing the pulley 12 to the latter, the pulley may be mounted for rotation on the shaft 22 and the latter fixed in the member 23.

Now having described the invention and the preferred embodiment thereof, it is to be understood that said invention is to be limited not to the specific details herein set forth, but only by the scope of the claim which follows:

I claim:

A speed reducing unit comprising a radially arranged bearing member composed of two contiguous sections having a bearing at its inner portion and provided at its outer portion with spaced bearings and having an intervening recess between said spaced bearings, a pulley partially housing the bearing member and having an internal gear and provided with a web, a short shaft fixed to the web and mounted for rotation in the bearing at the inner portion of the bearing member and provided with fastening means retaining the sections of the bearing member in their assembled position, and a planetary gear housed in the recess in the outer portion of the bearing member and having trunnions mounted in said spaced bearings at the outer portion of the bearing member, said planetary gear meshing with the internal gear of the pulley and having means for fixing it to a drive shaft, whereby the speed reducing unit is rigidly secured as a unit to the drive shaft and rotates as a unit with said drive shaft.

ROGER K. LEE.